Patented Aug. 27, 1946

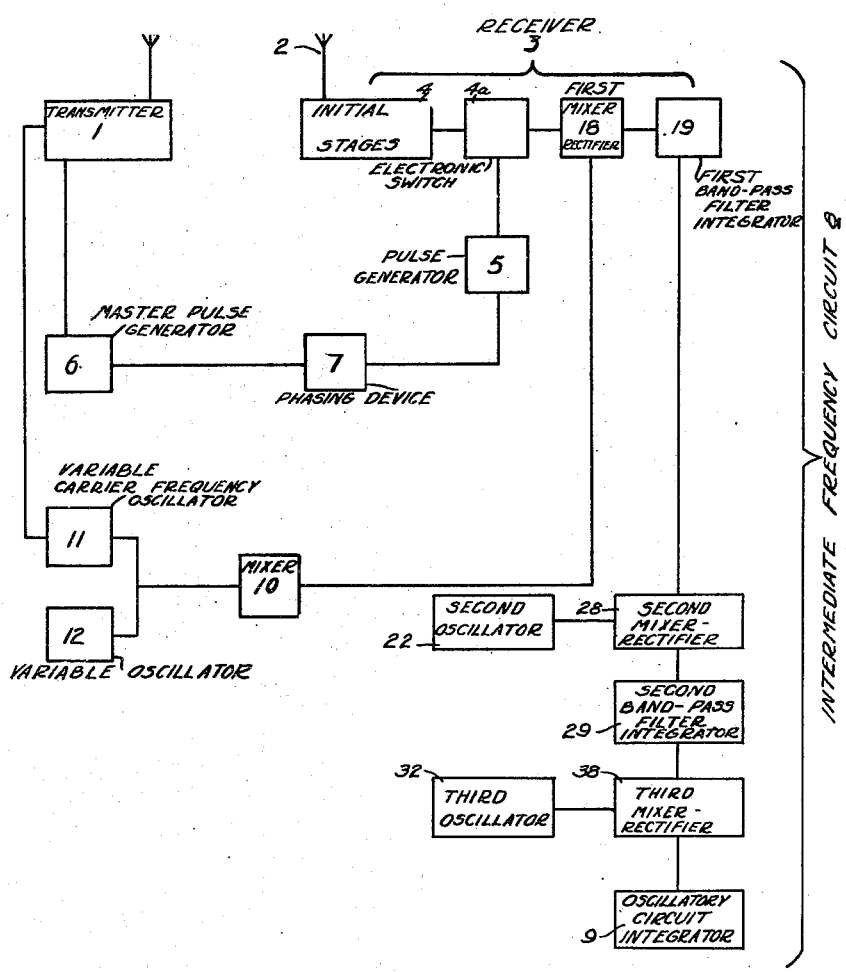

2,406,316

UNITED STATES PATENT OFFICE 2,406,316

RADIO PULSE SYSTEM WITH INTERFERENCE ELIMINATOR

Alan Dower Blumlein, Ealing, London W. 5, and Eric Lawrence Casling White, Hillingdon, England, assignors to Electric & Musical Industries Limited, Hayes, Middlesex, England, a company of Great Britain Application June 13, 1942, Serial No. 446,970
In Great Britain December 1, 1939

7 Claims. (Cl. 250—1)

This invention relates to improvements in apparatus for reducing the effect of interference in the observation of recurrent oscillatory signals.

In the reception of such signals, interference may arise from some source external to the receiver, or, if the signals to be received are very weak, from the thermal agitation or valve noise generated in the receiver itself. Such interference will be of a random nature and it is the object of the present invention to utilise this fact in order to reduce the effect of such undesired random signals in the observation of recurrent oscillatory signals.

Alternatively, random interference may be regarded as extending over a very wide frequency band, whereas the recurrent oscillatory signals will only have components at specific frequencies, and in another aspect, it may be said that the object of the present invention is to utilise this fact in order to reduce the effect of such undesired random signals in the observation of recurrent oscillatory signals.

According to one feature of the invention there is provided apparatus for observing desired recurrent oscillatory signals in a train of signals including undesired random signals comprising an integrating device adapted to have oscillations set up therein, switching means for selecting signals from said train of signals during spaced time intervals each coinciding with at least a portion of said desired signals, means for feeding said train of signals to said switching means and means for feeding signals selected by said switching device to said integrating device so as to set up oscillations therein, the oscillations set up by successive oscillatory signals adding in phase whereby said oscillations are integrated and the minimum value of the ratio of the amplitude of said desired and undesired signals during said time intervals is increased.

If desired, said integrated signals may be rectified and the rectified signals also integrated so as further to reduce the effect of said undesired random signal. Said oscillatory signals may also, if desired, be changed in frequency before integration.

According to a further feature of the invention, the above-mentioned features may be employed in the detection or determination of the position or distance of a reflecting object by radiating short bursts of oscillatory signals and receiving said oscillatory signals after reflection by said object. If the frequency of said received oscillatory signals is changed before integration, said change of frequency may be so controlled in accordance with the changes of frequency due to relative motion between said reflecting object and the receiver receiving said oscillatory signals that changes in the frequency of the oscillations of different frequency due to said motion are reduced or eliminated. The frequency of said radiated oscillatory signals may be slowly varied over a predetermined range in order to reduce the effect of interference of steady frequency.

Said switching means may comprise a thermionic valve which normally does not transmit signals but which is arranged to be rendered conducting so as to transmit signals during said time intervals by means of a voltage pulse applied to one of the electrodes thereof. Said apparatus preferably comprises means for heterodyning said desired oscillatory signals to a low intermediate frequency in which case said integrating device may be an oscillatory circuit tuned to said intermediate frequency, and said apparatus may also include a further integrating device and further switching means for feeding said rectified signals to said further integrating device during spaced time intervals. Means may also be provided for controlling said intermediate frequency in accordance with variations in the frequency of said received oscillatory signals due to relative motion between said reflecting object and the radiator of said oscillatory signals. Said integrating device may be arranged to be substantially non-responsive to intermediate frequency signals resulting from the heterodyning of said oscillatory signals received after reflection by other reflecting objects moving relative to said reflecting object.

The application of the invention to the detection of or the determination of the position or distances of a reflecting object will now be described by way of example with reference to the accompanying drawing which shows a general schematic circuit arrangement of the transmitting and receiving apparatus.

A method for the determination of the direction and position of aircraft has been proposed according to which short bursts of radio frequency oscillations are successively transmitted at predetermined intervals and are reflected back to a system of receivers by aircraft or other reflecting objects. When such aircraft are a considerable distance away from the transmitter and the receiving apparatus the reflected signals are very weak and may be below the noise level of the receiver. The reflected signals are, however, regularly recurrent and the effects of noise or interference upon their reception may be reduced by the application of the invention in the manner which will now be described. It will be assumed in the following description that the transmitter 1 radiates, under the control of the master pulse generator 6, an unmodulated carrier at a frequency of 100 megacycles per second for periods of 0.5 microsecond duration, there being 5000 such periods per second.

The signals reflected from the aircraft are picked up by an aerial 2 and fed to a receiver 3. The initial stages 4 of the receiver 3 are designed to accept the frequency band 100±1.5 megacycles per second in order to permit them to follow an envelope waveform having a time of rise of 0.5 microsecond. One or more of these initial stages 4a of the receiver are arranged to be normally quiescent, i. e., not to pass signals. This may be accomplished by including thermionic valve amplifying stages which are normally biased beyond current cut-off in a well known manner and to which voltage pulses are applied so as to make them operative to pass signals only for short time intervals of approximately 0.5 microsecond every 1/5000 sec. when the reflected signals to be received are present. The valves employed in such stages may be supplied with electrode voltages greatly in excess of the electrode voltages normally used with such valves due to the fact that only intermittent operation is required, so that the valves operate with an increased mutual conductance. Said pulses may be derived in known manner from a multi-vibrator pulse generator 5 which is controlled by the master pulse generator 6 through an adjustable phasing device 7 and may be applied in the positive sense to one or more of the control electrodes of said stages in known manner so as to bring the valves on to the operating parts of their characteristics.

The signals emerging from the "pulsed" stages which have just been referred to are next heterodyned down to a frequency of the order of 20 kilocycles per second in the mixer 8. This may be accomplished in successive stages; for example, the signals may first be heterodyned in a first mixer-rectifier 18, by local oscillations derived from an oscillator mixer 10 responsive to the carrier frequency oscillator 11 and an auxiliary oscillator 12, to a frequency of 10 megacycles per second. Then the signals may be passed through a first band-pass filter 19 and heterodyned in a second mixer-rectifier 28 with oscillations from a second oscillator 22 to 300 kilocycles per second and finally passed through a second band-pass filter 29 and heterodyned in a third mixer-rectifier 38 with oscillations from a third oscillator 32 to 20 kilocycles per second by mixing with local oscillations of appropriate frequency. The output of the third mixer-rectifier 38 is applied to an oscillatory circuit integrator 9. The 10 megacycles per second stages may have a bandwidth of ±200 kilocycles per second, the 300 kilocycles stages a bandwidth of ±3 kilocycles per second and the final intermediate frequency circuit 9 is an oscillatory circuit tuned to 20 kilocycles per second and has a bandwidth of ±200 cycles per second.

The effect of the successive heterodyning and bandwidth limitation process which has just been described is to integrate the successive reflected signals which are passed to the "pulsed" stages 4a of the receiver. If the aircraft giving the reflected signals has no component of velocity towards the transmitter and receiver, then the successive reflected signals will arrive in the same phase every 1/5000 sec. and will each set up oscillations in the final intermediate frequency circuits of the receiver. In view of the small pass band of these circuits and their correspondingly low decrement, the oscillation set up by each incoming signal will persist and will be reinforced by the next signal and so on, with the result that the amplitude of the oscillation set up will be directly proportional to the number of such signals received. The inteference which is present in the train of signals with the reflected signals, however, is of a random character and the effect of the interference in successive time intervals during which the reflected signals are integrated will not be directly additive, so that the ratio of the amplitudes of the signal and the interference will be increased in relation to the minimum ratio of the amplitudes of said oscillatory signals and said interference in said train of signals during said time intervals.

Although there is theoretically no limit to the number of successive signals which may be integrated, and although in theory the pass band of the final intermediate frequency may be made as narrow as possible in the particular case which has been referred to above, this condition is not realised if the aeroplane has a component of velocity towards the transmitter and receiver, and the pass band must in this case be widened. The aircraft may be assumed to be flying slower than 150 metres/sec. so that the maximum rate of change of path length for the radio signals to and from the aircraft is 300 metres/sec. This means that the path length changes by half the transmitted wavelength, i. e. 1.5 metres, in 1/200 sec. so that if the addition of the reflected signals is continued for more than this period, the relative phase of the radio frequency oscillator will have changed by more than 180° and the addition of further reflected signals will reduce the resultant signal amplitude. The decrement of the integrating circuit must therefore be adjusted so that the oscillation set up by a single incoming reflected signal decays practically to zero in 1/200 sec., that is the bandwidth of the circuit must be of the order ±100 or 200 cycles/sec. at 20 kilocycles/sec. Thus, 25 successive signals may be effectively added.

The operation of the system may alternatively be explained in the following manner. The signals sent out by the transmitter consist of a sequence of high frequency pulses and a signal of this type may be regarded as a continuous high frequency oscillation modulated by a recurrent modulating signal having a waveform consisting of a short pulse followed by a long interval. Such a waveform may be analysed into a series of components having frequencies equal to the frequency of repetition of the pulse and numerous harmonics of this frequency. The signal sent out by the transmitter therefore comprises a large number of component frequencies, namely, the carrier frequency and numerous sidebands spaced apart by said frequency of repetition. In the particular example quoted above the spectrum of the transmitted signal would consist of the carrier at 100 megacycles/sec. and a sequence of sidebands at 100±.005 $n$ megacycles sec. where $n$ may be 300 if the bandwidth of the transmitter is ±1.5 megacycles/sec.

The receiving system which has been described above may alternatively be regarded as a system which only receives signals falling within such frequency bands. The effect of "pulsing" may be regarded as mixing or heterodyning the incoming signals by means of a pulse waveform comprising the frequency 5,000 cycles/sec. and numerous harmonics of the frequency which together make up the pulse waveform. If the "pulsed" stages are followed by a heterodyning stage which effectively limits the pass band to ±200 cycles/sec., then it is clear that only input signals having frequencies lying within ±200 cycles/sec., of the carrier frequency and a series of frequencies spaced from the carrier frequency by intervals of 5000 cycles/sec. can give rise to an output in the heterodyning stage so that response of the receiver is effectively limited to those frequency bands containing some component of the signal to be received and in consequence the amplitude ratio between the signal and interference is improved due to the fact that components of interference having frequencies not contained in the desired signal are removed.

If the aircraft giving rise to the reflected signal is stationary, the reflected signal will be of the same waveform and will have the same component frequencies, but if it is moving, the Doppler effect will modify these frequencies, and it can be shown that for aircraft speeds up to 150 metres/sec. and a carrier frequency of 100 megacycles/sec. the shift of frequency will not exceed 100 cycles/sec. The component of the reflected signals will therefore always lie well within one series of frequency bands ±200 cycles/sec. wide centred at the frequencies $100 \pm .005\, n$ megacycles/sec., and in the reception of such signals only these frequency bands are required.

The frequency bands required for the reception of the reflected signal may be still further narrowed by taking up the frequency shift due to the Doppler effect either manually or automatically. Thus, the frequency of the heterodyning oscillators may be varied by small variable condensers in their frequency determining circuits so as to maintain the frequency of the final I. F. signal at its assigned value and thus permit the bandwidth of the final I. F. circuits to be reduced considerably below ±200 cycles/sec., thereby effecting a further reduction in the effect of interference. The necessary variation of frequency may be made manually by an observer or may be effected by the known methods of automatic frequency control.

Reflected signals from other reflecting objects moving relative to said reflecting object which it is desired to observe, for example, stationary objects will have a different frequency from the signals reflected by said reflecting object and may be rejected by sufficiently reducing the pass band of the integrating device, or by arranging the integrating device to be non-responsive to the intermediate frequency signal derived from the reflected signals received from such objects.

In order to reduce the effect of oscillator drift, the local oscillations may be derived in known manner by mixing in the mixer 10 an oscillation derived from the carrier frequency oscillator 11 of the transmitter with an oscillation of the desired intermediate frequency derived from another oscillator 12, the frequency stability of which is good relative to the pass band required of the desired intermediate frequency. For example, the first heterodyning oscillation may be obtained by mixing the carrier frequency oscillations from the transmitter with a stable oscillation of 10 megacycles per second, the frequency drift of the latter oscillator being small with reference to 200 kilocycles per second. Alternatively, the carrier frequency of the transmitter may be synthesised from a number of lower frequency oscillations including those required for the heterodyning stages of the receiver. Thus, if the I. F. frequenceis of the receiver are to be 10 megacycles/sec., 300 kilocycles/sec. and 20 kilocycles/sec. respectively, and the frequency of the transmitted carrier and the reflected signal to be received is 100 megacycles/sec. the local oscillator frequencies required will be 90 megacycles/sec., 9.7 megacycles/sec. and 280 kilocycles/sec. respectively. These frequencies may be generated by starting with oscillations operating at frequencies of 20 and 280 kilocycles/sec. mixing these oscillations to give the 300 kilocycles/sec. oscillation; mixing this 300 kilocycles/sec. oscillation with a 9.7 megacycles/sec. oscillation to give a 10 megacycle oscillation and finally mixing this 10 megacycle oscillation with a 90 megacycle oscillation to give the 100 megacycle oscillation required for the transmitter. Any variation of frequency of these oscillations, excepting the 20 kc. oscillations, will then not change the frequency of the final 20 kilocycle/sec. I. F. signal. This arrangement has the further advantage that, since the heterodyning oscillation is not derived from a signal frequency oscillation, the risk of a slight admixture of the signal frequency in the heterodyning frequency is prevented and interference, which the presence of such a component would cause, is therefore avoided.

The interfering effect of a steady carrier frequency in the methods of reception which have been described above may be reduced by modulating the carrier frequency of the transmitter at a very low frequency. It will be seen that the frequency of the transmitter must not change by more than a small fraction of 200 cycles/sec. in ⅕₀₀₀ sec., as otherwise successive reflected signals will not add with a sufficient degree of accuracy because the received signal may be heterodyned by an oscillation derived from the transmitter ⅕₀₀₀ sec. after transmission of a signal. A frequency variation of 10 cycles/sec. may, however, be permitted in ⅕₀₀₀ sec. and the frequency of the transmitter may be modulated over a range of ±2500 cycles/sec. in a period of ⅕ sec. That is to say, the frequency of the transmitter may be increased steadily during ¹⁄₁₀ sec. and then decreased steadily during the following ¹⁄₁₀ sec. and so on. This may be done by means of a mechanically rotated condenser in one of the frequency determining circuits of the transmitter. For a steady interfering signal, this frequency modulation of the transmitted carrier will give freedom from interference from such a signal for $$\frac{5000-400}{5000} \times 100 \text{ per cent}$$

i. e. 9.92 per cent of each ¹⁄₁₀ sec. period. A slower variation of frequency than that suggested above may of course be used.

If it is desired to examine a portion only of the envelope waveform of the oscillatory signals over a long succession of signals, the method described above may be used and the phase adjustment limited so that the receiver is only "pulsed" to receive the signal in the neighbourhood of that portion of the envelope waveform of the recurrent signal which is of interest. Further, the receiver may be pulsed when the signal is not present in order to integrate only the random interference, so as to enable the presence of the signal to be detected by the increase of the amplitudes of the integrated signal above that due to random interference alone.

Although the invention has been described as applied to the detection or determination of the position or distance of a reflecting object, it will be appreciated that it is generally applicable to the observation of recurrent oscillatory signals which are preferably recurrent at equal time intervals and which preferably have the same envelope waveform. The invention may be applied both prior to and subsequent to rectification. In the latter case, the integrating circuit may comprise a condenser.

What we claim is:

1. Apparatus for observing desired recurrent oscillatory signals in a train of signals including undesired random signals comprising an integrating device adapted to have oscillations set up therein, electronic switching means for selecting signals from said train of signals during spaced time intervals each coinciding with at least a portion of said desired signals, means for feeding said train of signals to said switching means and means for feeding signals selected by said switching device to said integrating device so as to set up oscillations therein, the oscillations set up by successive oscillatory signals adding in phase whereby said oscillations are integrated and the minimum value of the ratio of the amplitude of said desired and undesired signals during said time intervals is increased.

2. Apparatus according to claim 1, comprising rectifying means, means for feeding said oscillations developed in said integrating device to said rectifying means, a further integrating device, and means for feeding the rectified signals developed in said rectifying means to said further integrating device, whereby the minimum value of the ratio of the amplitude of the rectified desired oscillatory signals and the rectified undesired random interference is increased.

3. Apparatus for observing desired recurrent oscillatory signals in a train of signals including undesired random signals comprising frequency changing means for deriving oscillatory signals of lower frequency from said desired signals in said train, means for feeding said signals in said train to said frequency changing means, switching means for selecting signals during spaced time intervals coinciding with at least a portion of said desired signals, an oscillatory circuit of low decrement tuned to said lower frequency, means for feeding said signals of lower frequency to said oscillatory circuit so as to set up oscillations therein, so that the oscillations developed in said oscillatory circuit by said oscillatory signals of lower frequency derived from successive desired oscillatory signals add in phase whereby said oscillatory signals are integrated and the minimum value of the ratio of the amplitude of said desired and undesired signals during said time intervals is increased.

4. Apparatus for detecting a reflecting object comprising transmitting means for radiating short bursts of oscillatory signals, receiving means for receiving said signals after reflection by said object, frequency changing means for deriving oscillatory signals of lower frequency from said signals received by said receiving means, means for feeding said received signals to said frequency changing means, an oscillatory circuit of low decrement tuned to said lower frequency, means for feeding said signals of lower frequency to said oscillatory circuit so as to set up oscillations therein, switching means for selecting during time intervals at least a portion of said signals, said switching means being interposed between said receiving means and said oscillatory circuit so that the oscillations developed in said oscillatory circuit by said oscillatory signals of lower frequency derived from successive bursts of oscillatory signals add in phase whereby the minimum value of the ratio of the amplitude of said oscillatory signals and the amplitude of any random interference is increased.

5. Apparatus according to claim 4, in which said frequency changing means comprises means for rendering said lower frequency substantially independent of changes in the frequency of said received signals due to motion of said reflecting object.

6. Apparatus for detecting a reflecting object comprising generating means for generating continuous oscillations, frequency changing means for deriving from said generating means ocillations of a first frequency and oscillations of a second frequency so that the difference frequency between said first and second frequencies remains substantially constant, means for feeding oscillations from said generating means to said frequency changing means, transmitting means for radiating short bursts of oscillatory signals of said first frequency, means for feeding oscillations of said first frequency from said frequency changing means to said transmitting means, receiving means for receiving said signals after reflection by said object, mixing means for deriving oscillatory signals of lower frequency from said signals received by said receiving means and said oscillations of said second frequency, means for feeding said received signals and said oscillations of said second frequency to said mixing means, an oscillatory circuit of low decrement tuned to said lower frequency means for feeding said signals of lower frequency to said oscillatory circuit so as to set up oscillations therein, switching means for selecting during time intervals at least a portion of said signals, said switching means being interposed between said receiving means and said oscillatory circuit so that the oscillations developed in said oscillatory circuit by said oscillatory signals of lower frequency derived from successive bursts of oscillatory signals add in phase whereby the minimum value of the ratio of the amplitude of said oscillatory signals and the amplitude of any random interference is increased.

7. Apparatus according to claim 6 comprising means for slowly varying said first and second frequencies within a predetermined frequency range while maintaining their difference frequency substantially constant, whereby interference due to undesired signals of steady frequency is reduced.

ALAN DOWER BLUMLEIN.
ERIC LAWRENCE CASLING WHITE.